US012682538B2

(12) United States Patent
Chung et al.

(10) Patent No.: US 12,682,538 B2
(45) Date of Patent: Jul. 14, 2026

(54) DEVICE INCLUDING MOTION GENERATION ARTIFICIAL INTELLIGENCE ALGORITHM BASED ON SPATIOTEMPORAL FEATURE OF MOTION AND OPERATION METHOD THEREOF

(71) Applicant: AILIVE INC., Seongnam-si (KR)

(72) Inventors: Jungmin Chung, Yongin-si (KR); Kyoungchin Seo, Bucheon-si (KR); Dohee Lee, Seongnam-si (KR); Jihun Kim, Gunpo-si (KR)

(73) Assignee: AILIVE INC., Seongnam-si (KR)

( * ) Notice: Subject to any disclaimer, the term of this patent is extended or adjusted under 35 U.S.C. 154(b) by 0 days.

(21) Appl. No.: 19/191,143

(22) Filed: Apr. 28, 2025

(65) Prior Publication Data

US 2025/0292478 A1 Sep. 18, 2025

Related U.S. Application Data

(63) Continuation of application No. PCT/KR2024/003665, filed on Mar. 18, 2024.

(30) Foreign Application Priority Data

Mar. 13, 2024 (KR) ........................ 10-2024-0035197

(51) Int. Cl.
*G06T 13/80* (2011.01)
*G06F 40/30* (2020.01)
(52) U.S. Cl.
CPC .............. *G06T 13/80* (2013.01); *G06F 40/30* (2020.01)

(58) Field of Classification Search
None
See application file for complete search history.

(56) References Cited

U.S. PATENT DOCUMENTS 11,430,171 B2 * 8/2022 Amer .................... G06F 40/216
12,524,529 B1 * 1/2026 Siu ........................ G06F 21/552
(Continued)

FOREIGN PATENT DOCUMENTS

KR 10-2021-0041812 A 4/2021
KR 102490319 B1 1/2023
(Continued)

OTHER PUBLICATIONS

Messina et al.; "Text-to-Motion Retrieval: Towards Joint Understanding of Human Motion Data and Natural Language"; Proceedings of the 46th International ACM SIGIR Conference on Research and Development in Information Retrieval (SIGIR '23); Jul. 23-27, 2023; pp. 1-6.
(Continued)

*Primary Examiner* — Saptarshi Mazumder
(74) *Attorney, Agent, or Firm* — Studebaker Brackett PLLC

(57) ABSTRACT

Disclosed is a device including a motion generation artificial intelligence algorithm based on spatiotemporal feature of motion and an operating method thereof, and the device may include a memory configured to store at least one process for executing the motion generation artificial intelligence algorithm based on spatiotemporal features of motion; and a processor configured to execute the motion generation artificial intelligence algorithm based on spatiotemporal feature of motion according to the process.

8 Claims, 11 Drawing Sheets

(56) References Cited

U.S. PATENT DOCUMENTS

2025/0225706 A1 \*   7/2025   Petrovich .................. G06T 5/50
2025/0278881 A1 \*   9/2025   Zhuo ..................... G06F 40/284

FOREIGN PATENT DOCUMENTS

KR     10-2023-0018027  A     2/2023
KR     10-2023-0095432  A     6/2023
KR     10-2024-0013637  A     1/2024

OTHER PUBLICATIONS

International Search Report issued in PCT/KR2024/003665; mailed
Dec. 4, 2024.

\* cited by examiner

<u>100</u>    120    110

Server ←------→ Terminal

120

Communication module ~ 121

Memory ~ 122

Processor ~ 123

Database ~ 124

FIG. 4

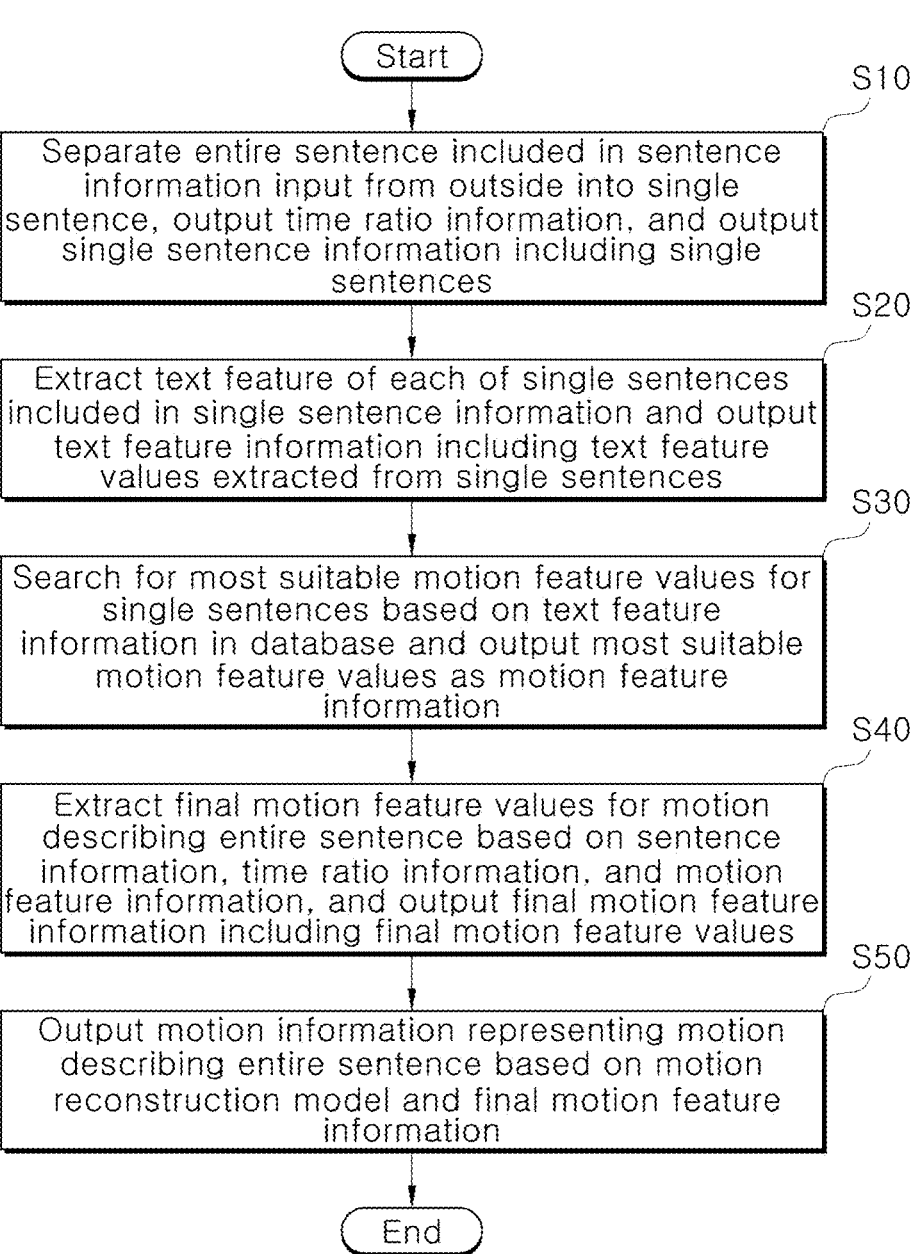

Start

S10

Separate entire sentence included in sentence information input from outside into single sentence, output time ratio information, and output single sentence information including single sentences

S20

Extract text feature of each of single sentences included in single sentence information and output text feature information including text feature values extracted from single sentences

S30

Search for most suitable motion feature values for single sentences based on text feature information in database and output most suitable motion feature values as motion feature information

S40

Extract final motion feature values for motion describing entire sentence based on sentence information, time ratio information, and motion feature information, and output final motion feature information including final motion feature values

S50

Output motion information representing motion describing entire sentence based on motion reconstruction model and final motion feature information End

DEVICE INCLUDING MOTION GENERATION ARTIFICIAL INTELLIGENCE ALGORITHM BASED ON SPATIOTEMPORAL FEATURE OF MOTION AND OPERATION METHOD THEREOF

CROSS-REFERENCE TO RELATED APPLICATIONS

The present application is a continuation of International Patent Application No. PCT/KR2024/003665, filed on Mar. 18, 2024, which is based upon and claims the benefit of priority to Korean Patent Application No. 10-2024-0035197 filed on Mar. 13, 2024. The disclosures of the above-listed applications are hereby incorporated by reference herein in their entirety.

BACKGROUND

1. Technical Field

The present disclosure relates to an electronic device and an operating method thereof, and more particularly, to a device including a motion generation artificial intelligence algorithm based on spatiotemporal feature of motion and an operating method thereof.

2. Description of Related Art

With the advancement of object recognition and machine learning, it has become possible to recognize objects such as backgrounds, locations, weather, objects, people, and animals in photographic images, and to describe the features (attributes) of the objects such as movement, shape, atmosphere, location, and posture as text. However, this is still at the stage of expressing photographic data as text, and there is a problem that it is impossible to express text data as video data as it is. Accordingly, the technology that provides movement information representing movement from entire text sentences is being studied.

SUMMARY

The purpose of the embodiment disclosed in the present disclosure is to provide a device including a motion generation artificial intelligence algorithm based on spatiotemporal feature of motion that provides motion information from text information, and an operating method thereof.

Technical problems of the inventive concept are not limited to the technical problems mentioned above, and other technical problems not mentioned will be clearly understood by those skilled in the art from the following description.

In an aspect of the present disclosure, a device may include a memory configured to store at least one process for executing the motion generation artificial intelligence algorithm based on spatiotemporal features of motion; and a processor configured to execute the motion generation artificial intelligence algorithm based on spatiotemporal feature of motion according to the process, wherein the processor includes: a sentence separation module configured to receive sentence information, separate an entire sentence included in the sentence information into a single sentence including one subject and one verb, output time ratio information indicating whether each of the movements describing the single sentences has a certain time ratio in an entire movement describing the entire sentence, and output single sentence information including the single sentences; a text feature extraction module configured to extract a text feature of each of the single sentences included in the single sentence information, and output text feature information including text feature values extracted from the single sentences; a motion feature search module configured to search for most suitable motion feature values for each of the single sentences based on the text feature information in a database storing motion feature values for each motion item, and output motion feature information including the most suitable motion feature values for each single sentence; a motion information integration module configured to extract final motion feature values for motion describing the entire sentence based on the sentence information, the time ratio information, and the motion feature information, and output final motion feature information including the final motion feature values; and a motion reconstruction module configured to output motion information representing the motion describing the entire sentence based on a motion reconstruction model and the final motion feature information.

In another aspect of the present disclosure, an operation method performed by a device may include a sentence separation step of separating an entire sentence included in sentence information input from an outside into a single sentence including one subject and one verb, outputting time ratio information indicating whether each of the movements describing the single sentences has a certain time ratio in an entire movement describing the entire sentence, and outputting single sentence information including the single sentences; a text feature extraction step of extracting a text feature of each of the single sentences included in the single sentence information, and outputting text feature information including text feature values extracted from the single sentences; a motion feature search step of searching for most suitable motion feature values for each of the single sentences based on the text feature information in a database storing motion feature values for each motion item, and outputting motion feature information including the most suitable motion feature values; a motion information integration step of extracting final motion feature values for motion describing the entire sentence based on the sentence information, the time ratio information, and the motion feature information, and outputting final motion feature information including the final motion feature values; and a motion reconstruction step of outputting motion information representing the motion describing the entire sentence based on a motion reconstruction model and the final motion feature information.

In addition, a computer program stored in a computer-readable recording medium for implementing the present disclosure may be further provided.

In addition, a computer-readable recording medium recording a computer program for implementing the present disclosure may be further provided.

BRIEF DESCRIPTION OF THE FIGURES

FIG. 4 is a flowchart illustrating an operation method of a device according to the present disclosure.

FIG. 8 is a diagram for describing an exemplary embodiment of the motion feature extraction module of the present disclosure.

DETAILED DESCRIPTION

Figures 1, 2:
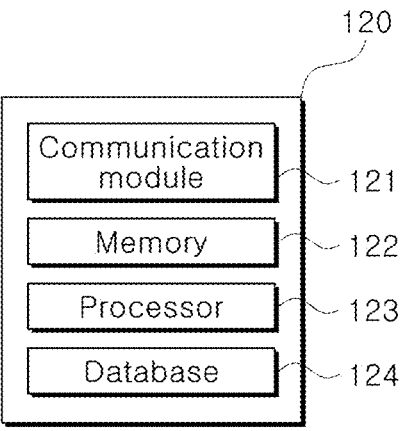
FIG. 1 is a block diagram illustrating a system according to the present disclosure.
FIG. 2 is a block diagram illustrating a configuration of the server of FIG. 1.

In the drawings, the same reference numeral refers to the same element. This disclosure does not describe all elements of embodiments, and general contents in the technical field to which the present disclosure belongs or repeated contents of the embodiments will be omitted. The terms, such as "unit, module, member, and block" may be embodied as hardware or software, and a plurality of "units, modules, members, and blocks" may be implemented as one element, or a unit, a module, a member, or a block may include a plurality of elements.

Throughout this specification, when a part is referred to as being "connected" to another part, this includes "direct connection" and "indirect connection", and the indirect connection may include connection via a wireless communication network.

Furthermore, when a certain part "includes" a certain element, other elements are not excluded unless explicitly described otherwise, and other elements may in fact be included.

In the entire specification of the present disclosure, when any member is located "on" another member, this includes a case in which still another member is present between both members as well as a case in which one member is in contact with another member.

The terms "first," "second," and the like are just to distinguish an element from any other element, and elements are not limited by the terms.

The singular form of the elements may be understood into the plural form unless otherwise specifically stated in the context.

Identification codes in each operation are used not for describing the order of the operations but for convenience of description, and the operations may be implemented differently from the order described unless there is a specific order explicitly described in the context.

The operating principle and embodiments of the present disclosure are described below with reference to the attached drawings.

In this specification, the term 'device according to the present disclosure' includes all of various devices that can perform computational processing and provide results to the user. For example, the device may include all of a computer, a server device, and a portable terminal, or may be in the form of one of them.

Here, the computer may include, for example, a notebook, a desktop, a laptop, a tablet PC, a slate PC, and the like mounted with a web browser.

The server device is a server that communicates with an external device to process information, and may include an application server, a computing server, a database server, a file server, a mail server, a proxy server, and a web server.

A portable terminal is a wireless communication device that ensures portability and mobility, and may include all kinds of handheld-based wireless communication devices such as PCS (Personal Communication System), GSM (Global System for Mobile communications), PDC (Personal Digital Cellular), PHS (Personal Handyphone System), PDA (Personal Digital Assistant), IMT (International Mobile Telecommunication)-2000, CDMA (Code Division Multiple Access)-2000, W-CDMA (W-Code Division Multiple Access), WiBro (Wireless Broadband Internet) terminal, a smart phone, and the like, and a wearable device such as at least one of a watch, a ring, bracelets, anklets, a necklace, glasses, contact lenses, or a head-mounted device (HMD).

The function related to artificial intelligence according to the present disclosure operates through a processor and a memory. The processor may be composed of one or more processors. At this time, the one or more processors may be a general-purpose processor such as a CPU, an AP, a DSP (Digital Signal Processor), a graphics-only processor such as a GPU, a VPU (Vision Processing Unit), or an artificial intelligence-only processor such as an NPU. The one or more processors control input data to be processed according to a predefined operation rule or artificial intelligence model stored in the memory. Alternatively, in the case that the one or more processors are artificial intelligence-only processors, the artificial intelligence-only processor may be designed as a hardware structure specialized for processing a specific artificial intelligence model.

The predefined operation rule or artificial intelligence model may be created through learning. Here, being created through learning means that a basic artificial intelligence model is trained by using a plurality of learning data by a learning algorithm, thereby creating a predefined operation rule or artificial intelligence model set to perform a desired feature (or, purpose). Such learning may be performed on the device itself in which the artificial intelligence according to the present disclosure is performed, or may be performed through a separate server and/or system. Examples of learning algorithms include supervised learning, unsupervised learning, semi-supervised learning, or reinforcement learning, but are not limited to the examples described above.

The artificial intelligence model may include a plurality of neural network layers. Each of the plurality of neural network layers has a plurality of weights, and performs neural network operations through operations between the operation results of the previous layer and the plurality of weights. The plurality of weights of the plurality of neural network layers may be optimized by the learning results of the artificial intelligence model. For example, the plurality of weights may be updated so that the loss value or cost value acquired by the artificial intelligence model is reduced or minimized during the learning process. The artificial neural network may include a deep neural network (DNN), for example, a convolutional neural network (CNN), a deep neural network (DNN), a recurrent neural network (RNN), a restricted Boltzmann machine (RBM), a deep belief network (DBN), a bidirectional recurrent deep neural network (BRDNN), or a deep Q-network, but is not limited to the examples described above.

According to an exemplary embodiment of the present disclosure, the processor may implement artificial intelligence. Artificial intelligence refers to a machine learning method based on an artificial neural network that imitates human neurons (biological neurons) to enable a machine to learn. The artificial intelligence methodology may be divided into supervised learning in which input data and output data are provided together as training data according to a learning method so that the answer (output data) to a problem (input data) is determined, unsupervised learning in which only input data is provided without output data so that the answer (output data) to a problem (input data) is not determined, and reinforcement learning in which a reward is given from an external environment whenever an action is taken in a current state (State), and learning is performed in a direction to maximize this reward. In addition, the methodology of artificial intelligence can be classified according to the architecture, which is the structure of the learning model. The architecture of widely used deep learning technology can be classified into convolutional neural network (CNN), recurrent neural network (RNN), transformer, and generative adversarial network (GAN).

The present device and system may include an artificial intelligence model. The artificial intelligence model may be one artificial intelligence model or may be implemented as multiple artificial intelligence models. The artificial intelligence model may be composed of a neural network (or artificial neural network) and may include a statistical learning algorithm that mimics the neurons of biology in machine learning and cognitive science. A neural network may mean an overall model that has problem-solving capabilities by changing the strength of the synapse connection through learning by forming a network with artificial neurons (nodes) that combine synapses. The neurons of the neural network may include a combination of weights or biases. The neural network may include one or more layers composed of one or more neurons or nodes. For example, the device may include an input layer, a hidden layer, and an output layer. The neural network constituting the device can infer a desired result (output) from an arbitrary input (input) by changing the weights of neurons through learning.

The processor may generate a neural network, train (or learn) a neural network, perform a calculation based on received input data, generate an information signal based on the result of the calculation, or retrain the neural network. The models of the neural network may include various types of models such as CNN (Convolution Neural Network) such as GoogleNet, AlexNet, VGG Network, R-CNN (Region with Convolution Neural Network), RPN (Region Proposal Network), RNN (Recurrent Neural Network), S-DNN (Stacking-based deep Neural Network), S-SDNN (State-Space Dynamic Neural Network), Deconvolution Network, DBN (Deep Belief Network), RBM (Restricted Boltzman Machine), Fully Convolutional Network, LSTM (Long Short-Term Memory) Network, Classification Network, and the like, but are not limited thereto. The processor may include one or more processors for performing calculations according to the models of the neural network. For example, a neural network may include a deep neural network.

The neural network may include CNN (Convolutional Neural Network), RNN (Recurrent Neural Network), percept, multilayer perceptron, FF (Feed Forward), RBF (Radial Basis Network), DFF (Deep Feed Forward), LSTM (Long Short Term Memory), Gated Recurrent Unit (GRU), Auto Encoder (AE), Variational Auto Encoder (VAE), Denoising Auto Encoder (DAE), Sparse Auto Encoder (SAE), Markov Chain (MC), Hopfield Network (HN), Boltzmann Machine (BM), Restricted Boltzmann Machine (RBM), Depp Belief Network (DBN), Deep Convolutional Network (DCN), Deconvolutional Network (DN), Deep Convolutional Inverse Graphics Network (DCIGN), Generative Adversarial Network (GAN), Liquid State Machine (LSM), Extreme Learning Machine (ELM), Echo State Network (ESN), Deep Residual Network (DRN), Differentiable Neural Computer (DNC), Neural Turning Machine (NTM), Capsule Network (CN), Kohonen Network (KN), and Attention Network (AN), but not limited thereto, and it will be understood by those skilled in the art that any neural network may be included.

According to an exemplary embodiment of the present disclosure, the processor may use various artificial intelligence structures and algorithms such as CNN (Convolution Neural Network), R-CNN (Region with Convolution Neural Network), RPN (Region Proposal Network), RNN (Recurrent Neural Network), S-DNN (Stacking-based deep Neural Network), S-SDNN (State-Space Dynamic Neural Network), Deconvolution Network, DBN (Deep Belief Network), RBM (Restricted Boltzmann Machine), Fully Convolutional Network, LSTM (Long Short-Term Memory) Network, Classification Network, Generative Modeling, explainable AI, Continual AI, Representation Learning, and AI for Material Design such as GoogleNet, AlexNet, VGG Network, BERT, SP-BERT, MRC/QA, Text Analysis, Dialog System, GPT-3, and GPT-4 for natural language processing, Visual Analytics, Visual Understanding, Video Synthesis for vision processing, Anomaly Detection, Prediction, Time-Series Forecasting, Optimization, and Recommendation for algorithms ResNet for data intelligence, but not limited thereto. Hereinafter, the embodiment of the present disclosure will be described in detail.

FIG. 1 is a block diagram illustrating a system according to the present disclosure, and FIG. 2 is a block diagram illustrating a configuration of the server of FIG. 1.

Referring to FIG. 1 and FIG. 2, a terminal 110 may transmit various data to a server 120. The terminal 110 is a wireless communication device that ensures portability and mobility, and may include all kinds of handheld-based wireless communication devices such as the aforementioned PCS (Personal Communication System), GSM (Global System for Mobile communications), PDC (Personal Digital Cellular), smart phones, and wearable devices such as watches and rings. The number of terminals 110 may be one or more. At this time, each of the different users may perform communication with the server 120 using their own terminals 110. For example, a general user using an application program provided by the server 120 may use a service provided by the application program by using the terminal 110.

The server 120 is an electronic device that may communicate with at least one terminal 110, execute a program of program data, and extract academic information that links multiple databases.

The server 120 may include a communication module 121, a memory 122, a processor 123, and a database 124.

The communication module 121 may communicate with at least one terminal 110. At this time, the communication module 121 may include a wireless communication module that supports various wireless communication methods such as GSM (Global System for Mobile Communication), CDMA (Code Division Multiple Access), WCDMA (Wideband Code Division Multiple Access), UMTS (Universal Mobile Telecommunications System), TDMA (Time Division Multiple Access), LTE (Long Term Evolution), 4G, 5G, and 6G, in addition to a WiFi module and a WiBro (Wireless broadband) module.

The memory 122 may store data on an algorithm for controlling the operation of components within the device or a program that reproduces the algorithm, and may be implemented as at least one processor 123 that performs the aforementioned operation using the data stored in the memory 122. Here, the memory 122 and the processor 123 may be implemented as separate chips, respectively. In addition, the memory 122 and the processor 123 may be implemented as a single chip.

The memory 122 may store data supporting various functions of the device, a program for the operation of the processor 123, may store input/output data, and may store a plurality of application programs (or applications) run on the device, data for the operation of the device, and commands. At least some of these application programs may be downloaded from an external server via wireless communication.

The memory 122 may include at least one type of storage medium among a flash memory type, a hard disk type, an SSD type, an SDD type, a multimedia card micro type, a card type memory (e.g., an SD or XD memory, etc.), a random access memory (RAM), a static random access memory (SRAM), a read-only memory (ROM), an electrically erasable programmable read-only memory (EE-PROM), a programmable read-only memory (PROM), a magnetic memory, a magnetic disk, and an optical disk. In addition, the memory 122 may be a database that is separate from the device but connected by wire or wirelessly.

In an exemplary embodiment, the memory 122 may store at least one process for executing a motion generation artificial intelligence algorithm based on spatiotemporal features of motion.

The processor 123 may execute a motion generation artificial intelligence algorithm based on the spatiotemporal feature of the motion according to the process stored in the memory 122.

The database 124 may store various data. The number of databases 124 may be one or more. In an exemplary embodiment, the database 124 may store motion feature data values for each motion item. For example, the database 124 may store motion feature data values of a first motion item corresponding to a first motion, motion feature data values of a second motion item corresponding to a second motion, and the like.

At least one component may be added or deleted in accordance with the performance of the components illustrated in FIGS. 1 and 2. In addition, it will be easily understood by those skilled in the art that the mutual positions of the components may be changed in accordance with the performance or structure of the system.

Figure 3:
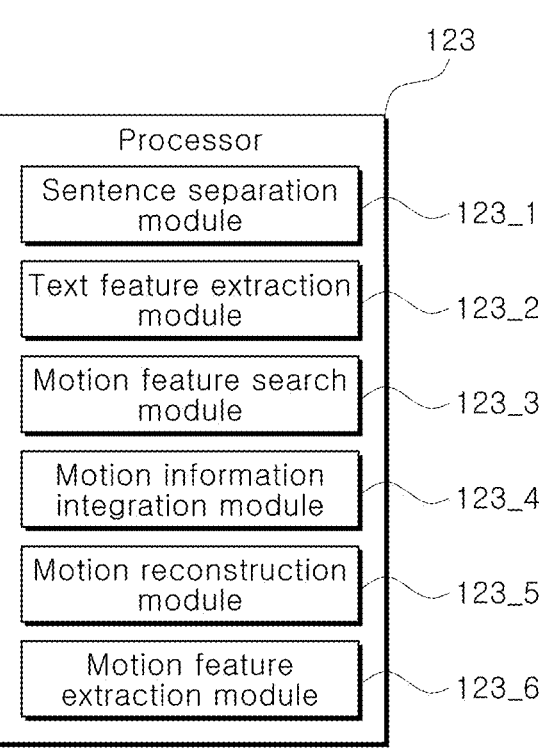
FIG. 3 is a block diagram illustrating a configuration of the processor of FIG. 2.

FIG. 3 is a block diagram illustrating a configuration of the processor of FIG. 2.

Referring to FIG. 3, the processor 123 may include a sentence separation module 123_1, a text feature extraction module 123_2, a motion feature search module 123_3, a motion information integration module 123_4, and a motion reconstruction module 123_5.

The sentence separation module 123_1 may receive sentence information. For example, the sentence separation module 123_1 may receive sentence information from the terminal 110. As another example, the sentence separation module 123_1 may receive sentence information through a user input unit of the server 120. The sentence information may be a text including one or more single sentences. All single sentences included in the sentence information may be referred to as an entire sentence. A single sentence may be a sentence including one subject and one verb in various languages such as Korean, English, Chinese, or Japanese. For example, a single sentence may be expressed as "a man is waving his hand". However, the exemplary embodiment of the present disclosure is not limited to the above-described examples. The sentence separation module 123_1 may separate the entire sentence included in the sentence information into a single sentence including one subject and one verb. The sentence separation module 123_1 may output single sentence information including single sentences and time ratio information, respectively. The time ratio information may be information indicating whether each of the movements describing the single sentences has a certain time ratio in the entire movement describing the entire sentence. At this time, the time ratio may indicate the influence of the movement action corresponding to each single sentence in the entire movement.

The text feature extraction module 123_2 may extract a text feature of each of the single sentences included in the single sentence information. The text feature extraction module 123_2 may output text feature information including text feature values extracted from the single sentences.

The motion feature search module 123_3 may search for the most suitable motion feature values for each of the single sentences based on text feature information in the database 124 that stores motion feature values for each motion item. The motion feature search module 123_3 may output motion feature information including the most suitable motion feature values for each single sentence.

The motion information integration module 123_4 may extract final motion feature values for the motion describing the entire sentence based on the sentence information, the time ratio information, and the motion feature information. The motion information integration module 123_4 may output final motion feature information including the final motion feature values.

The motion reconstruction module 123_5 may output motion information representing the motion describing the entire sentence based on the motion reconstruction model and the final motion feature information.

In an exemplary embodiment, the processor 123 may further include a motion feature extraction module 123_6. The motion feature extraction module 123_6 may receive first motion information representing a first motion describing a first single sentence. For example, the motion feature extraction module 123_6 may receive the first motion information through a user input unit of the terminal 110 and/or the server 120. In addition, the motion feature extraction module 123_6 may receive first text feature information including a first text feature value of the first single sentence. For example, the motion feature extraction module 123_6 may receive the first text feature information through a user input unit of the terminal 110 and/or the server 120. The motion feature extraction module 123_6 may extract motion features of the first motion based on the first text feature value. The motion feature extraction module 123_6 may output first motion feature information including the motion features of the first motion. The motion feature extraction module 123_6 may store the first motion feature information in the database 124. The trained motion data may be characterized by utilizing the trained feature extraction module, and the characterized data may be stored in the form of the database 124.

In an exemplary embodiment, in the case that the processor 123 further includes the motion feature extraction module 123_6, the text feature extraction module 123_2 may receive first single sentence information through the user input unit of the terminal 110 and/or the server 120. The text feature extraction module 123_2 may map the first single sentence information to the first text feature value using a pre-trained text feature extraction model. The text feature extraction module 123_2 may output the first text feature information. The motion reconstruction module 123_5 may output the first motion information reconstructed based on the first motion feature information.

FIG. 4 is a flowchart illustrating an operation method of a device according to the present disclosure.

Referring to FIG. 4, in step S10, the processor 123 separates the entire sentence included in the sentence information input from the outside into a single sentence, outputs time ratio information, and outputs single sentence information including the single sentences. Step S10 may be referred to as a sentence separation step and may be performed by the sentence separation module 123_1.

In step S20, the processor 123 extracts a text feature of each of the single sentences included in the single sentence information and outputs text feature information including text feature values extracted from the single sentences. Step S20 may be referred to as a text feature extraction step and may be performed by the text feature extraction module 123_2.

In step S30, the processor 123 searches for the most suitable motion feature values for the single sentences based on the text feature information in the database 124 and outputs the most suitable motion feature values as motion feature information. Step S30 may be referred to as a motion feature search step and may be performed by the motion feature search module 123_3.

In step S40, the processor 123 extracts final motion feature values for motion describing the entire sentence based on the sentence information, the time ratio information, and the motion feature information, and outputs final motion feature information including the final motion feature values. Step S40 may be referred to as a motion information integration step and may be performed by the motion information integration module 123_4.

In step S50, the processor 123 outputs motion information representing the motion describing the entire sentence based on the motion reconstruction model and the final motion feature information. Step S50 may be referred to as a motion reconstruction step and may be performed by the motion reconstruction module 123_5.

Although not shown, the method of operating the device further includes step S60, in which the motion feature extraction module 123_6 receives the first motion information and the first text feature information, extracts motion features of the first motion based on the first text feature value, outputs the first motion feature information including the motion features of the first motion, and stores the first motion feature information in the database.

Figure 5:
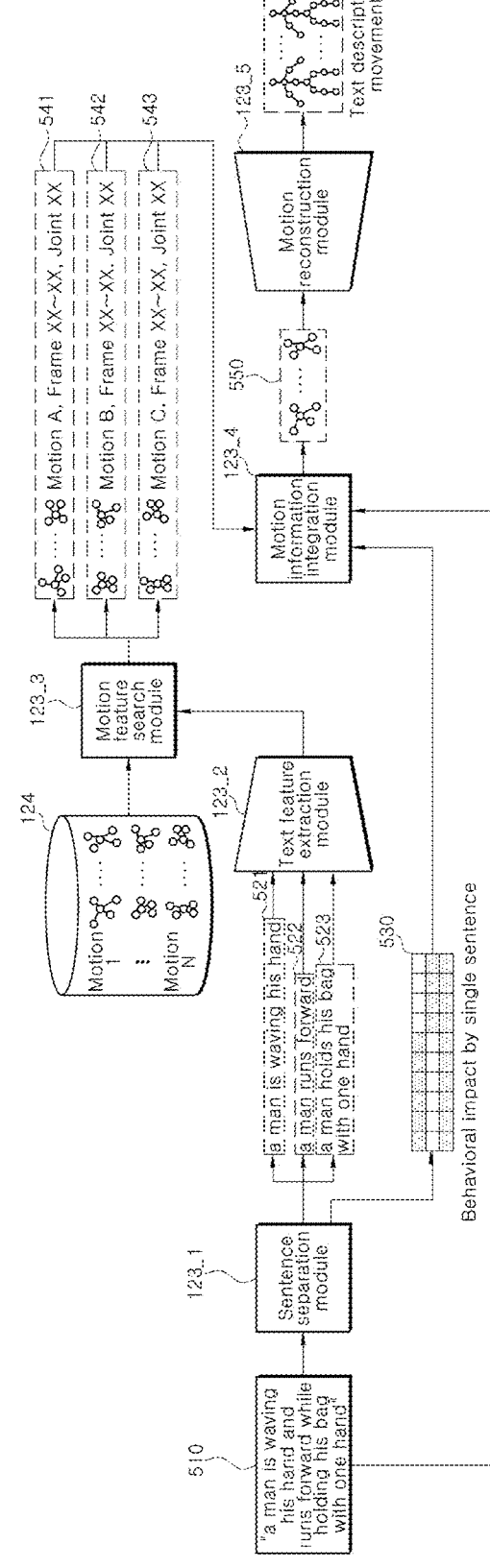
FIG. 5 is a diagram for describing an exemplary embodiment of the processor of the present disclosure.

FIG. 5 is a diagram for describing an exemplary embodiment of the processor of the present disclosure.

Referring to FIG. 5, sentence information 510 may include the entire sentence. For example, it is assumed that the entire sentence is "a man is waving his hand and runs forward while holding his bag with one hand." However, the exemplary embodiments of the present disclosure are not limited to the example of FIG. 5. The sentence information 510 may be input to the sentence separation module 123_1. The sentence separation module 123_1 may separate the entire sentence into a single sentence including one subject and one verb. Referring to FIG. 5, for example, the sentence separation module 123_1 may separate the entire sentence into first to third single sentences. In FIG. 5, it is assumed that the entire sentence included in the sentence information 510 includes three single sentences. However, the exemplary embodiments of the present disclosure are not limited to the example of FIG. 5. For example, the first single sentence 521 may be "a man is waving his hand", the second single sentence 522 may be "a man runs forward", and the third single sentence 523 may be "a man holds his bag with one hand." The sentence separation module 123_1 may output single character information including the single sentences. For example, the sentence separation module 123_1 may output the first single sentence information 521 including the first single sentence, the second single sentence information 522 including the second single sentence, and the third single sentence information 523 including the third single sentence. Meanwhile, the sentence separation module 123_1 may output time ratio information 530 respectively. Referring to FIG. 5, for example, the time ratio information may be information indicating whether the movements described by each of the first to third single sentences have a certain time ratio in the overall movement. Alternatively, it may be information indicating the time ratio occupied by each single sentence. The time ratio of each of the first to third single sentences may be displayed as illustrated in FIG. 5.

The text feature extraction module 123_2 may extract text feature values for each single sentence based on the single sentence information. For example, the text feature extraction module 123_2 may extract the text feature values of each of the first to third single sentences based on the first to third single sentence information 521, 522, and 523, respectively.

The database 124 may store the motion feature values of each of the first to $N^{th}$ motions. The motion feature search module 123_3 may search and return motion feature values suitable for a single sentence from the database 124 based on the text feature values of each sentence. The motion feature search module 123_3 may search for motion feature values in the database 124 as many times as the number of single characters. For example, the motion feature search module 123_3 searches and returns motion feature values suitable for the motion described by the first single sentence from the database 124 based on the text feature values of the first single sentence, and outputs first motion feature information 541. The motion feature search module 123_3 searches and returns motion feature values suitable for the motion described by the second single sentence from the database 124 based on the text feature value of the second single sentence, and outputs second motion feature information 542. The motion feature search module 123_3 searches and returns motion feature values suitable for the motion described by the third single sentence from the database 124 based on the text feature value of the third single sentence, and outputs third motion feature information 543.

In an exemplary embodiment, the motion feature search module 123_3 may extract detailed time information of the searched specific motion, rather than returning all motion feature values of the searched specific motion. The motion feature search module 123_3 may return the first motion feature values representing some frames for the entire frames of the motion item searched from the database 124 or some periods for the entire period of the motion item searched as the most suitable motion feature values. For example, the first motion feature information 541 may include the first motion feature values of the motion between 3.5 seconds and 5.8 seconds of the first motion. The second motion feature information 542 may include the first motion feature values of the motion between some frames of the $k^{th}$ motion. The third motion feature information 543 may include the first motion feature values of the motion between some frames of the $j^{th}$ motion. k and j may be any numbers less than or equal to N. However, the present invention is not limited thereto.

In an exemplary embodiment, the motion feature search module 123_3 may also extract information on which joint information is the most meaningful within the time period.

For example, in the case that the information of the left arm and the right leg is the most important within the extracted time, the second motion feature values corresponding to the nodes representing the left arm and the right leg may be extracted. The motion feature search module 123_3 may additionally return the second motion feature values representing the most important and the most relevant body structures in the movement of the searched motion item within some frames or some periods as the most suitable motion feature values. For example, the first motion feature information 541 may include the second motion feature values representing the right arm between 3.5 seconds and 5.8 seconds of the first motion. However, it is not limited thereto.

In an exemplary embodiment, the motion feature search module 123_3 may provide diversity to the post-order search results used as output to generate various motion feature values.

The motion information integration module 123_4 may receive initial input sentences and returned search result motion feature values, refine the extracted motion feature values and the entire input sentence into final motion features, and output feature values containing the features of the motion to be generated. The motion information integration module 123_4 may receive the first to third motion feature information 541, 542, and 543, the sentence information 510, and the time ratio information 530, and output final motion feature information 550 including final motion feature values based on the first to third motion feature information 541, 542, and 543, the sentence information 510, and the time ratio information 530.

The motion reconstruction module 123_5 may receive motion feature values, generate a final motion using the motion feature values, and output motion information to be reconstructed. The motion reconstruction module 123_5 may receive the final motion feature information 550 and output motion information 560 representing the motion describing the entire sentence based on the final motion feature information 550.

Figure 6:
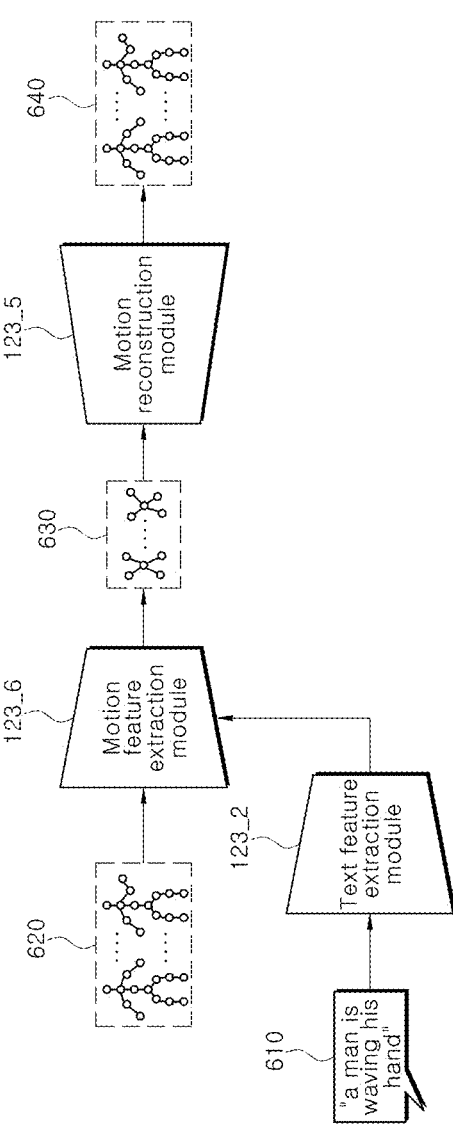
FIG. 6 is a diagram for describing an exemplary embodiment of the processor of the present disclosure.

FIG. 6 is a diagram for describing an exemplary embodiment of the processor of the present disclosure.

Referring to FIG. 6, the text feature extraction module 123_2 may receive first single sentence information 610 including the first single sentence, map the first single sentence information 610 to the first text feature value using a pre-trained text feature extraction model, and output the first text feature information. In an exemplary embodiment, the text feature extraction module 123_2 may include a CLIP (Contrastive Language-Image Pre-training) model that is trained in advance to map information of an input sentence into the form of features. However, the present disclosure is not limited thereto, and an AI model other than the CLIP model for extracting information from an input text may be included in the feature extraction module 123_2.

The motion feature extraction module 123_6 may receive first motion information 620 representing a first motion describing a first single sentence. In addition, the motion feature extraction module 123_6 may receive first text feature information including a first text feature value of the first single sentence from the text feature extraction module 123_2. The motion feature extraction module 123_6 may extract motion features of the first motion based on the first text feature value, and output first motion feature information 630 including the motion features of the first motion.

The movement reconstruction module 123_5 may output first movement information 640 reconstructed based on the first movement feature information 630. The first movement information 640 may be the same reconstruction data as the input first movement information 620.

FIGS. 7A to 7E are diagrams for describing nodes corresponding to body parts as an example.

The movement feature information, for example, the first movement feature information 630 of FIG. 6, may include a feature value containing movement data information and may express information based on body structure information. Appropriate body structure information may vary depending on a user's setting.

Figure 7A:
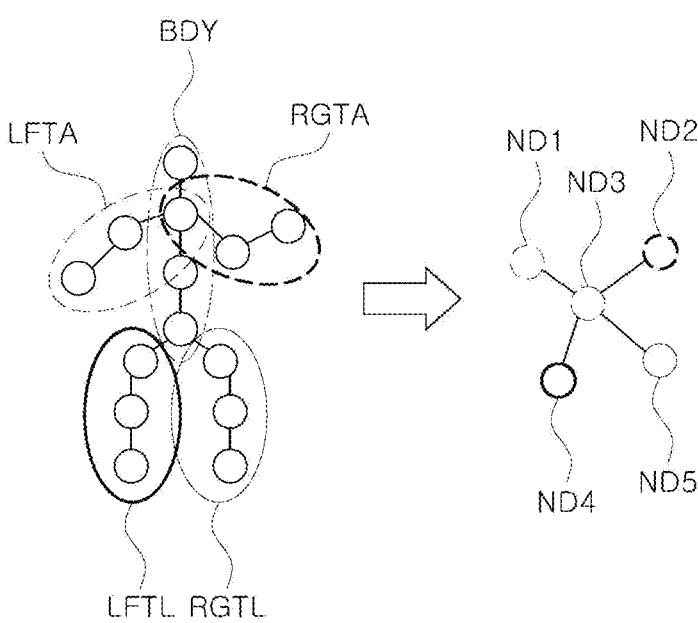
FIGS. 7A to 7E are diagrams for describing nodes corresponding to body parts as an example.

Referring to FIG. 7A, information on arms, legs, and torso may be expressed as one piece of information each, and human movement may be expressed as five basic nodes. For example, the body structure may be divided into a torso BDY, a left arm LFTA, a right arm RGTA, a left leg LFTL, and a right leg RGTL, and each body structure may correspond to each node. For example, the first node ND1 may correspond to the left arm LFTA, the second node N2 may correspond to the right arm RGTA, the third node ND3 may correspond to the torso BDY, the fourth node ND4 may correspond to the left leg LFTL, and the fifth node ND5 may correspond to the right leg RGTL. Motion feature values representing each of the first to fifth nodes ND1 to ND5 may be extracted. The embodiment according to FIG. 7A may be applied to an application case utilizing general motion.

Figure 7B:
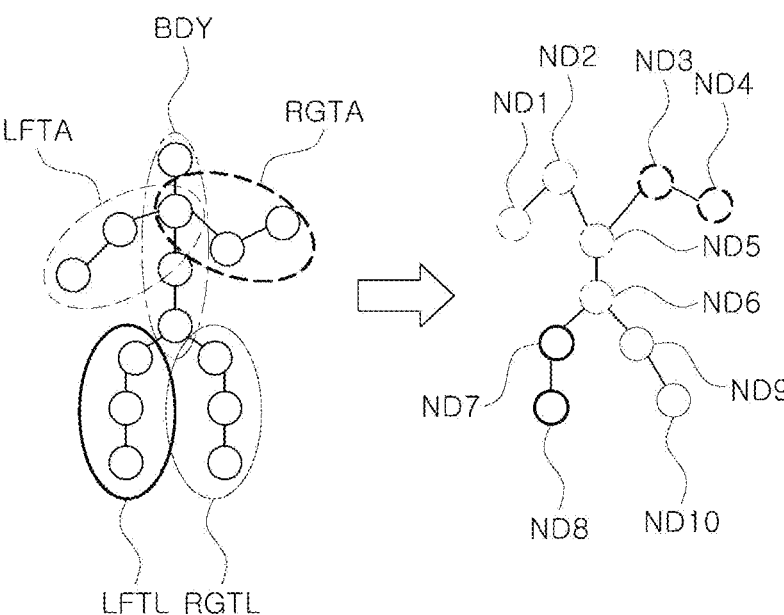

Referring to FIG. 7B, more information is expressed in a part having a large movement, and each part may express information such as motion, speed, direction, and rotation evenly and diversely. For example, the body structure may be divided into a torso BDY, a left arm LFTA, a right arm RGTA, a left leg LFTL, and a right leg RGTL. The first and second nodes ND1, ND2 correspond to the left arm LFTA, the third and fourth nodes ND3, ND4 correspond to the right arm RGTA, the fifth and sixth nodes ND5, ND6 correspond to the torso BDY, the seventh and eighth nodes ND7, ND8 correspond to the left leg LFTL, and the ninth and tenth nodes ND9, ND10 correspond to the right leg RGTL. Motion feature values representing each of the first to tenth nodes ND1 to ND10 may be extracted. The embodiment according to FIG. 7B may be suitable for applications such as movement and posture.

Figure 7C:
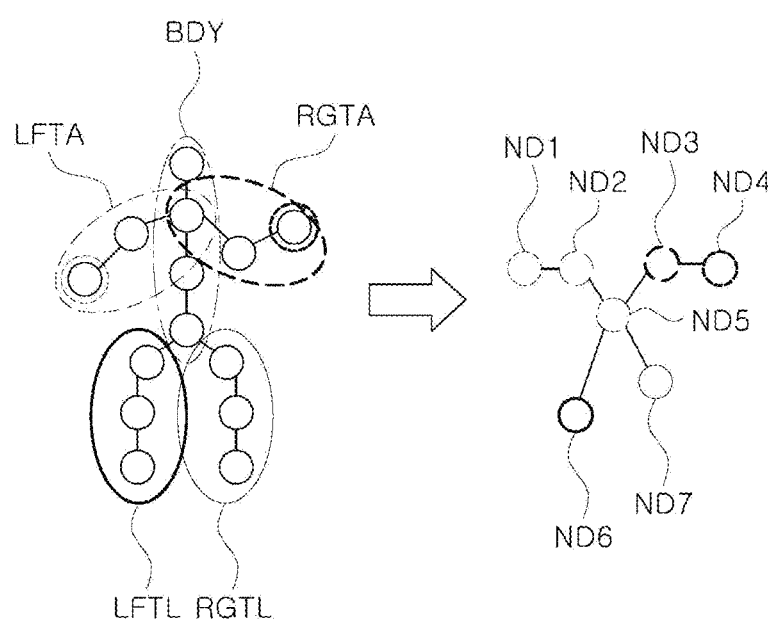

Referring to FIG. 7C, additional information nodes may be used for finger movements. For example, the body structure may be divided into a torso BDY, a left arm LFTA, a left hand LFTH, a right arm RGTA, a right hand RGTH, a left leg LFTL, and a right leg RGTL. The first node ND1 may correspond to the left hand LFTH, the second node ND2 may correspond to the left arm LFTA, the third node ND3 may correspond to the right arm RGTA, the fourth node ND4 may correspond to the right hand RGTH, the fifth node ND5 may correspond to the torso BDY, the sixth node ND6 may correspond to the left leg LFTL, and the seventh node ND7 may correspond to the right leg RGTL. Motion feature values representing each of the first to seventh nodes ND1 to ND7 may be extracted. The embodiment according to FIG. 7C may be suitable for use in a process in which movement of the upper body, particularly the hand, is important.

Figure 7D:
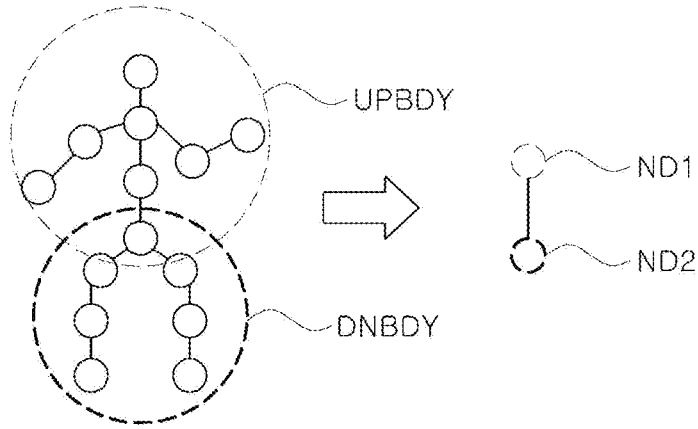

Referring to FIG. 7D, the movement of the upper body and the lower body are expressed as separate nodes. The body structure may be divided into the upper body or upper body UPBDY and the lower body or lower body DNBDY. The first node ND1 may correspond to the upper body UPBDY, and the second node ND2 may correspond to the lower body DNBDY. The movement feature values representing each of the first and second nodes ND1, ND2 may be extracted. The embodiment according to FIG. 7D may be used to quickly express movement information.

Figure 7E:
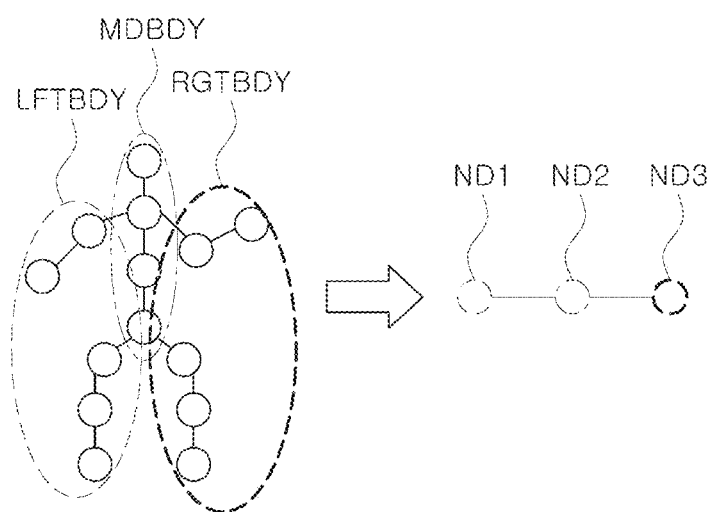

Referring to FIG. 7E, the movement of the body may be expressed as left, right, and middle, and the body structure may be divided into the left body LFTBDY, the middle body MDBDY, and the right body RGTBDY. The first node ND1 may correspond to the left body LFTBDY, the second node ND2 may correspond to the middle body MDBDY, and the third node ND3 may correspond to the right body RGTBDY. Motion feature values representing each of the first to third nodes ND1 to ND3 may be extracted. The embodiment according to FIG. 7e may be used in a process of expressing asymmetrical motion.

Figure 8:
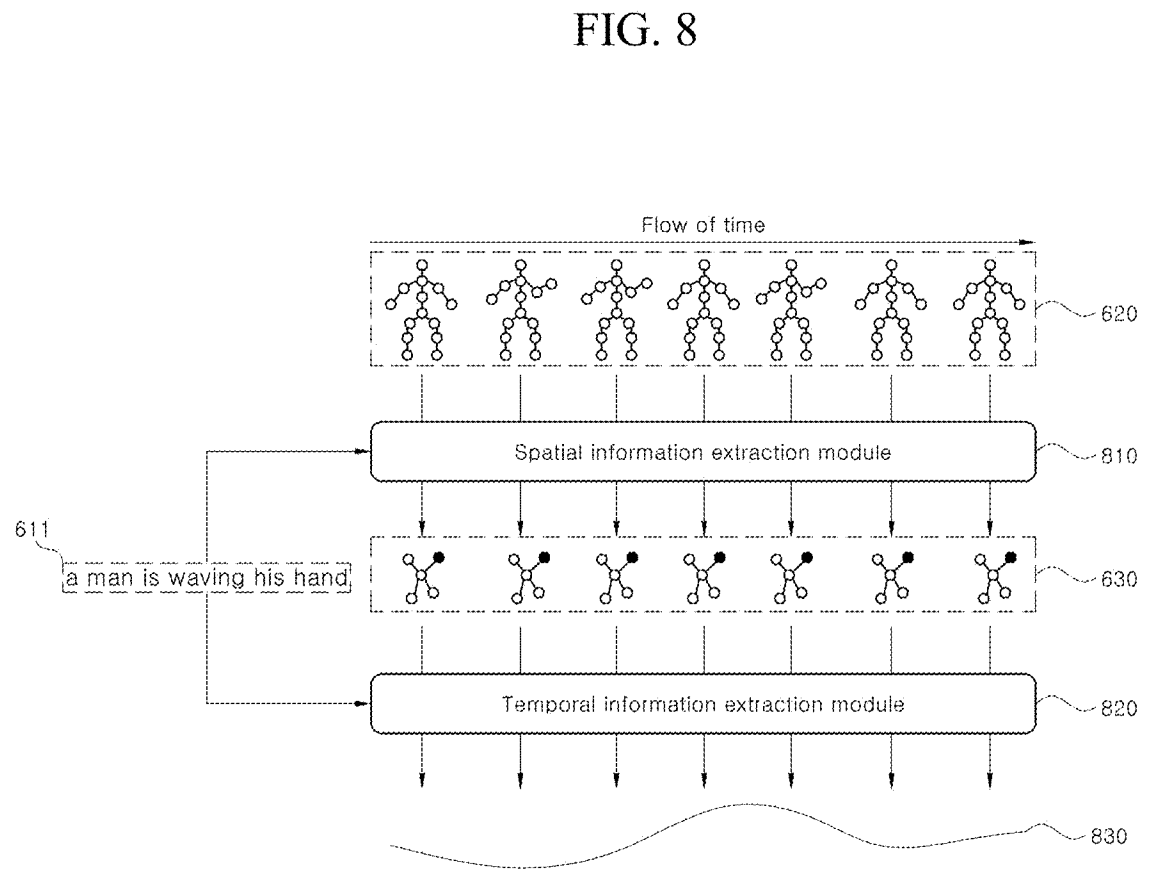

FIG. 8 is a diagram for describing an exemplary embodiment of the motion feature extraction module of the present disclosure.

Referring to FIG. 8, the motion feature extraction module 123_6 may express motion features based on input motion and text information, and may learn the temporal importance of the motion temporal information and the part of the important joint spatial information by utilizing the Attention module to generate motion feature values.

In an exemplary embodiment, the motion feature extraction module 123_6 may include a spatial information extraction module 810 and a temporal information extraction module 820.

The spatial information extraction module 810 may extract third motion feature values representing nodes corresponding to body parts and important nodes corresponding to the most important body parts in the first motion information 620 that change over time based on the first text feature value 611, and output spatial information 630 including the third motion feature values.

The temporal information extraction module 820 may extract fourth motion feature values representing temporal importance or similarity of the first motion based on the first text feature value 611 and the third motion feature values of the spatial information 630, and output temporal information 830 including the fourth motion feature values.

Figure 9:
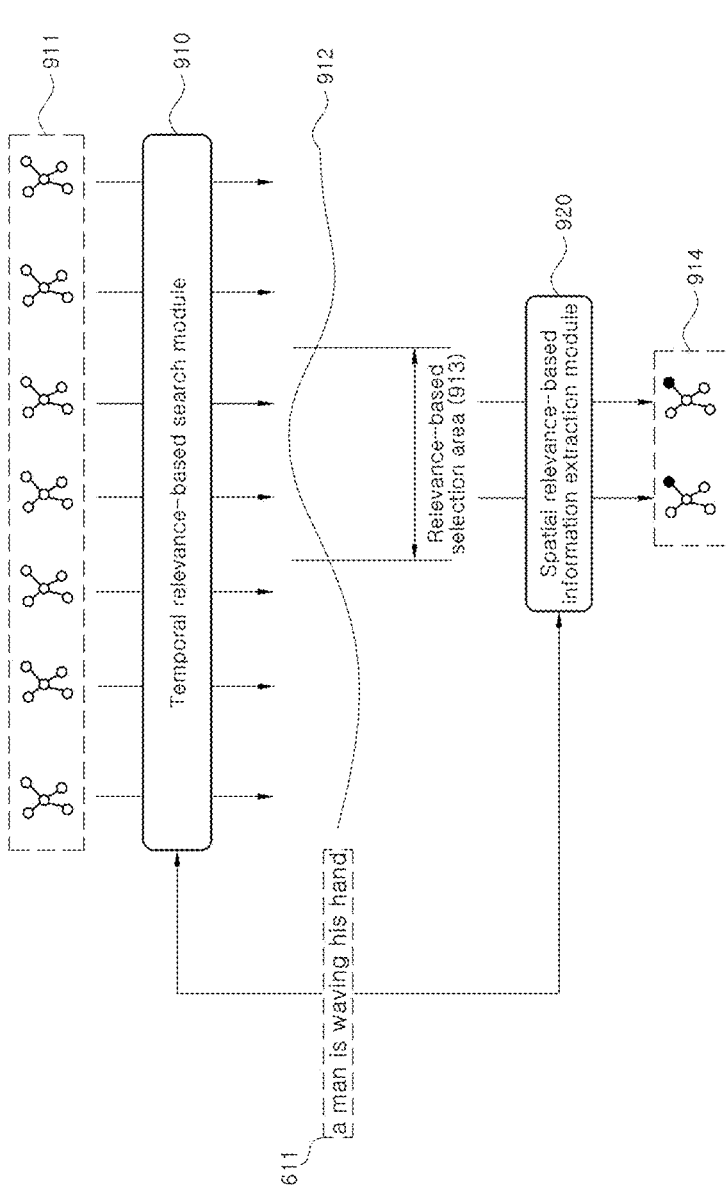
FIG. 9 is a diagram for describing an exemplary embodiment of a motion feature search module of the present disclosure.

FIG. 9 is a diagram for describing an exemplary embodiment of a motion feature search module of the present disclosure.

Referring to FIG. 9, the motion feature search module 123_3 may include a temporal relevance-based search module 910 and a spatial relevance-based information extraction module 920.

The temporal relevance-based search module 910 may calculate temporal semantic relevance based on the correlation between the motion feature vector and the text feature value, and may select a section with high relevance based on a specific threshold value.

The temporal relevance-based search module 910 may calculate temporal relevances for each motion item and each single sentence based on the correlation between the motion feature vector including the motion feature values of each motion item and the text feature value of each single sentence, and may select a selection region including temporal relevances greater than the reference relevance among the temporal relevances for each of the single sentences. For example, the temporal relevance-based search module 910 may calculate temporal relevances 912 of the first single sentence based on the correlation between the first feature vector 911 and the first text feature value 611. Then, the temporal relevance-based search module 910 may select a relevance-based selection area 913 that includes temporal relevances greater than the reference relevance among the temporal relevances 912.

The spatial relevance-based information extraction module 920 may extract nodes having a large amount of information in the feature value by using the feature value of the relevance-based selection area 913. The spatial relevance-based information extraction module 920 may extract nodes corresponding to body parts based on the temporal relevances and the text feature value of each single sentence within the selection area.

In an exemplary embodiment, the spatial relevance-based information extraction module 920 may return the nodes corresponding to the body parts and the subsequent candidate nodes corresponding to the body parts according to the temporal relevance within the selected area.

The above-described process is performed for each independent single sentence, and similar motion feature values may be derived for each single sentence, and various subsequent candidates may also be returned according to the relevance value used in the search process, and diversity may be secured in the final output result through random selection among these candidates.

Figure 10:
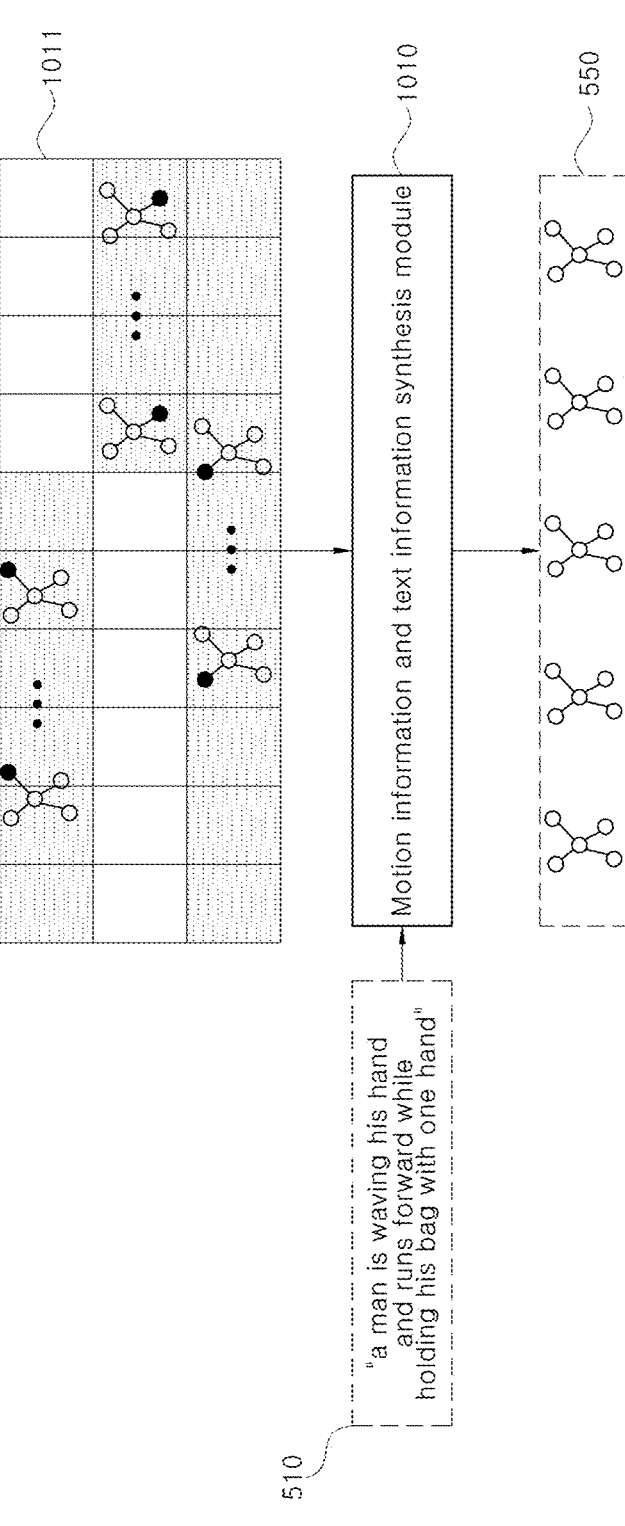
FIG. 10 is a diagram for describing an exemplary embodiment of the motion information integration module of the present disclosure.

FIG. 10 is a diagram for describing an exemplary embodiment of the motion information integration module of the present disclosure.

Referring to FIG. 10, the motion information integration module 123_4 may include a motion information and text information synthesis module 1010, and the motion information and text information synthesis module 1010 may receive a motion feature value expressing each single sentence, a ratio of each motion feature value to be used in the entire movement, and a user input text, and output a final motion feature value.

The motion information and text information synthesis module 1010 may output the final motion feature information 550 based on the sentence information 510 and the synthesis information 1011. The synthesis information 1011 may be information synthesized from time ratio information 530 and the first to third motion feature information 541, 542, and 543.

In an exemplary embodiment, the motion information integration module 123_4 may utilize the detailed motion part feature value in the process of generating the motion feature value based on the entire sentence of the sentence information. In an exemplary embodiment, the motion information integration module 123_4 may generate the motion feature value based on the motion usage ratio corresponding to the time ratio.

The above-described program may include codes coded in a computer language, such as C, C++, JAVA, or machine language, that may be read by the processor CPU of the computer through the device interface of the computer, so that the computer reads the program and executes the methods implemented as the program. Such codes may include functional codes related to functions that define necessary functions for executing the methods, and may include control codes related to execution procedures necessary for the processor of the computer to execute the functions according to a predetermined procedure. In addition, the code may further include a memory reference-related code regarding which location address of the internal or external memory of the computer should be referenced for additional information or media required for the processor of the computer to execute the functions. In addition, if the processor of the computer needs to communicate with any other computer or server located remotely to execute the functions, the code may further include a communication-related code regarding how to communicate with any other computer or server located remotely using the communication module of the computer, what information or media should be sent and received during the communication, etc.

The medium in which the storage is performed means a medium that semi-permanently stores data and may be read by a device, rather than a medium that stores data for a short period of time, such as a register, cache, or memory. Specifically, examples of the medium in which the storage is performed include, but are not limited to, ROM, RAM, CD-ROM, magnetic tape, floppy disk, or optical data storage device. That is, the program may be stored in various recording media on various servers that the computer may access or in various recording media on the user's computer. In addition, the media may be distributed to computer systems connected to a network, so that computer-readable codes may be stored in a distributed manner.

The steps of the method or algorithm described in connection with the embodiments of the present disclosure may be implemented directly in hardware, implemented as a software module executed by hardware, or implemented by a combination of these. The software module may reside in random access memory (RAM), read only memory (ROM), erasable programmable ROM (EPROM), electrically erasable programmable ROM (EEPROM), flash memory, a hard disk, a removable disk, a CD-ROM, or any form of computer-readable recording medium well known in the art to which the present disclosure belongs.

Although the embodiments of the present disclosure have been described above with reference to the attached drawings, those skilled in the art will appreciate that the present disclosure may be implemented in other specific forms without changing the technical idea or essential features thereof. Therefore, it should be understood that the embodiments described above are illustrative in all respects and not restrictive.

According to the present disclosure, there is an effect of providing an artificial intelligence model that provides motion information from text information and provides motion for a single sentence from the entire sentence.

The effects of the present disclosure are not limited to the effects mentioned above, and other effects not mentioned will be clearly understood by those skilled in the art from the description.

What is claimed is:

1. A device including a motion generation artificial intelligence algorithm based on spatiotemporal feature of motion, comprising:

a memory configured to store at least one process for executing the motion generation artificial intelligence algorithm based on spatiotemporal features of motion; and a processor configured to execute the motion generation artificial intelligence algorithm based on spatiotemporal feature of motion according to the process, wherein the processor comprises:

a sentence separation module configured to receive sentence information, separate an entire sentence included in the sentence information into single sentences including one subject and one verb, output time ratio information indicating whether each of movements describing the single sentences has a certain time ratio in an entire movement describing the entire sentence, and output single sentence information including the single sentences, the time ratio information indicating an influence of the movements corresponding to the single sentences in the entire movement;

a text feature extraction module configured to extract a text feature of each of the single sentences included in the single sentence information, and output text feature information including text feature values extracted from the single sentences;

a motion feature search module configured to search for most suitable motion feature values for each of the single sentences based on the text feature information in a database storing motion feature values for each motion item, and output motion feature information including the most suitable motion feature values for each single sentence;

a motion information integration module configured to extract final motion feature values for motion describing the entire sentence based on the sentence information, the time ratio information, and the motion feature information, and output final motion feature information including the final motion feature values; and a motion reconstruction module configured to output motion information representing the motion describing the entire sentence based on a motion reconstruction model and the final motion feature information, wherein the motion feature search module is configured to return, among all motion feature values of motion items searched from the database, first motion feature values representing some frames for an entire frame of the searched motion item or some periods for an entire period of the searched motion item as the most suitable motion feature values, wherein the motion feature search module is configured to additionally return second motion feature values representing most important and most relevant body structures in the movement of the searched motion item within the some frames or the some periods, as the most suitable motion feature values, and wherein the motion feature search module is configured to divide a human movement into nodes corresponding to a torso, a left arm, a right arm, a left leg, and a right leg, and extract motion feature values of the respective nodes, and is further configured to extract the second motion feature values representing the most important and the most relevant body structures, based on joint information in the movement of the motion item within the some frames or the some periods.

2. The device according to claim 1,
wherein the processor further comprises:

a motion feature extraction module configured to receive first motion information representing a first motion describing a first single sentence and first text feature information including a first text feature value of the first single sentence, extract motion features of the first motion based on the first text feature value, output first motion feature information including the motion features of the first motion, and store the first motion feature information in the database, wherein the text feature extraction module is configured to receive first single sentence information including the first single sentence, map the first single sentence information to the first text feature value using a pre-trained text feature extraction model, and output the first text feature information, and wherein the motion reconstruction module is configured to output the first motion information reconstructed based on the first motion feature information.

3. The device according to claim 2,
wherein the motion feature extraction module comprises:

a spatial information extraction module configured to extract third motion feature values representing nodes corresponding to body parts and important nodes corresponding to most important body part in the first motion that changes over time based on the first text feature values, and output spatial information including the third motion feature values; and a temporal information extraction module configured to extract fourth motion feature values representing temporal importance of the first motion over time based on the first text feature values and the third motion feature values, and output temporal information including the fourth motion feature values.

4. The device according to claim 1, wherein the motion feature search module comprises:

a temporal relevance-based searching module configured to calculate temporal relevances for each motion item and each single sentence based on the correlation between the motion feature vector including the motion feature values of each motion item and the text feature value of each single sentence, and select a selection area including the temporal relevance greater than a reference relevance among the temporal relevances for each of the single sentences; and a spatial relevance-based information extraction module configured to extract nodes corresponding to body parts based on the temporal relevances within the selection area and the text feature values of each single sentence.

5. The device according to claim 4, wherein the spatial relevance-based information extraction module is configured to: return the nodes corresponding to the body parts and the subsequent candidate nodes corresponding to the body parts according to the temporal relevance within the selection area.

6. The device according to claim 1, wherein the motion information integration module is configured to utilize a detailed motion part feature value in the process of generating the motion feature value based on the entire sentence of the sentence information.

7. The device according to claim 6, wherein the motion information integration module is configured to generate the motion feature value based on a motion usage ratio corresponding to the time ratio.

8. An operation method performed by a device including a motion generation artificial intelligence algorithm based on spatiotemporal feature of motion, comprising:

a sentence separation step of separating an entire sentence included in sentence information input from an outside into single sentences including one subject and one verb, outputting time ratio information indicating whether each of movements describing the single sentences has a certain time ratio in an entire movement describing the entire sentence, and outputting single sentence information including the single sentences, the time ratio information indicating an influence of the movements corresponding to the single sentences in the entire movement;

a text feature extraction step of extracting a text feature of each of the single sentences included in the single sentence information, and outputting text feature information including text feature values extracted from the single sentences;

a motion feature search step of searching for most suitable motion feature values for each of the single sentences based on the text feature information in a database storing motion feature values for each motion item, and outputting motion feature information including the most suitable motion feature values;

a motion information integration step of extracting final motion feature values for motion describing the entire sentence based on the sentence information, the time ratio information, and the motion feature information, and outputting final motion feature information including the final motion feature values; and a motion reconstruction step of outputting motion information representing the motion describing the entire sentence based on a motion reconstruction model and the final motion feature information, wherein the motion feature search step includes returning, among all motion feature values of motion items searched from the database, first motion feature values representing some frames for an entire frame of the searched motion item or some periods for an entire period of the searched motion item as the most suitable motion feature values, wherein the motion feature search step includes additionally returning second motion feature values representing most important and most relevant body structures in the movement of the searched motion item within the some frames or the some periods, as the most suitable motion feature values, and wherein the motion feature search step includes dividing a human movement into nodes corresponding to a torso, a left arm, a right arm, a left leg, and a right leg, and extract motion feature values of the respective nodes, and extracting the second motion feature values representing most important and most relevant body structures, based on joint information, in the movement of the motion item within the some frames or the some periods.

* * * * *